United States Patent
Kato et al.

[11] Patent Number: 6,141,085
[45] Date of Patent: Oct. 31, 2000

[54] DISTANCE MEASURING APPARATUS

[75] Inventors: Masahiko Kato, Akiruno; Kenji Kitazawa, Hikone, both of Japan

[73] Assignees: Olympus Optical Co., Ltd.; Takata Corporation, both of Tokyo, Japan

[21] Appl. No.: 09/189,084

[22] Filed: Nov. 9, 1998

[30] Foreign Application Priority Data

Nov. 27, 1997 [JP] Japan ..................... 9-325968

[51] Int. Cl.⁷ .................................... G01C 3/08
[52] U.S. Cl. ................ 356/4.01; 180/169; 356/5.01; 356/5.1
[58] Field of Search .................. 180/169; 356/4.01, 356/4.07, 5.01–5.15, 141.1

[56] References Cited

U.S. PATENT DOCUMENTS

| | | | |
|---|---|---|---|
| 3,892,483 | 7/1975 | Saufferer . | |
| 4,681,431 | 7/1987 | Sims et al. . | |
| 5,313,262 | 5/1994 | Leonard | 180/169 |
| 5,455,669 | 10/1995 | Wetteborn | 356/5.1 |
| 5,541,724 | 7/1996 | Hoashi | 356/5.1 |
| 5,589,930 | 12/1996 | Kurahashi et al. | 356/5.08 |
| 5,831,717 | 11/1998 | Ikebuchi | 356/4.01 |
| 5,877,849 | 3/1999 | Ramer et al. | 356/3.01 |

FOREIGN PATENT DOCUMENTS 6-118161 4/1994 Japan .
7-253460 10/1995 Japan .

*Primary Examiner*—Stephen C. Buczinski
*Attorney, Agent, or Firm*—Frishauf, Holtz, Goodman, Langer & Chick, P.C.

[57] ABSTRACT

A light transmitting lens includes in a portion thereof a diffusion element constituted by a number of small prisms. The small prisms have the same height and different pitches depending on distances from an optical axis. Accordingly, the small prisms have different apical angles depending on the distances from the optical axis. The light transmitting lens has a function for collimating lights incident on the small prisms with the same apical angle. Light beams passed through the region of the diffusion element of the light transmitting lens are deflected at predetermined angles depending on the positions, however, the light beams passed through the other region of the light transmitting lens are collimated without deflection.

6 Claims, 4 Drawing Sheets

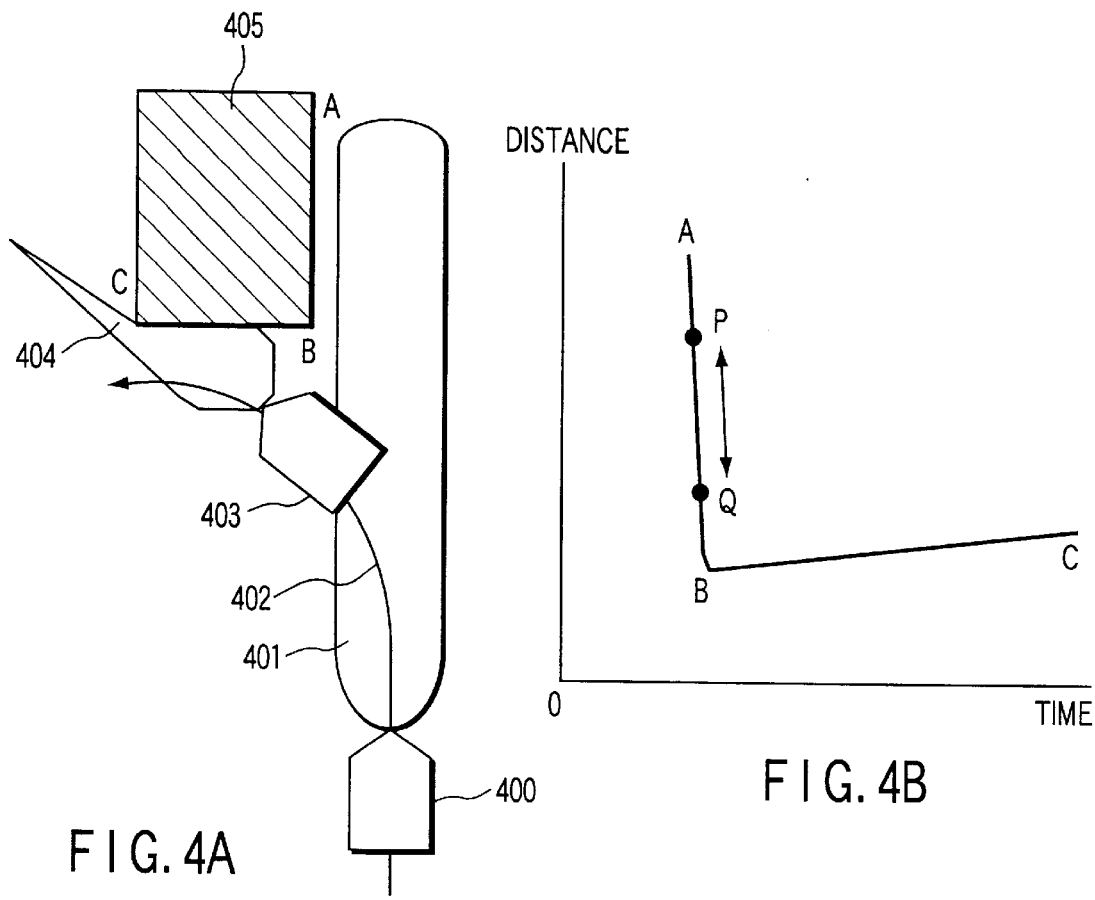
FIG. 4A
FIG. 4B
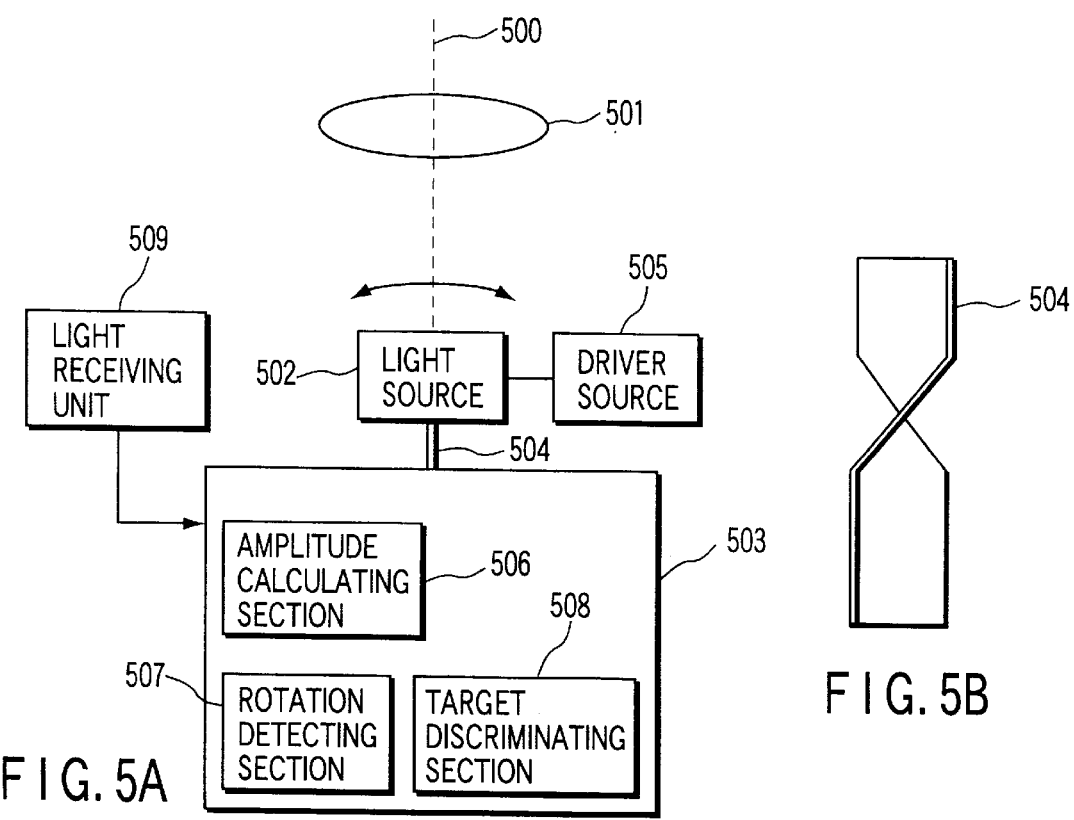
FIG. 5A
FIG. 5B

DISTANCE MEASURING APPARATUS

BACKGROUND OF THE INVENTION

The present invention relates to a distance measuring apparatus for radiating a light beam to an object to be measured and measuring a distance to the object on the basis of the light reflected by the object.

Jpn. Pat. Appln. KOKAI Publication No. 7-253460 discloses a distance measuring apparatus having a prism for splitting light radiated from a transmission lens into a plurality of directions in order to detect obstacles in a plurality of directions. Jpn. Pat. Appln. KOKAI Publication No. 6-118161 discloses an optical sensing apparatus for deforming a light transmission pattern by arranging diffraction gratings in front of a semiconductor laser.

Both of the above prior art publications teach a technique for expanding the detection range by expanding the radiation angle of a light beam. However, they do not teach a technique for maintaining the intensity of a reflection signal in the expanded radiation angle.

BRIEF SUMMARY OF THE INVENTION

The present invention has been made in view of the aforementioned prior art, and has as its object to provide a distance measuring apparatus in which the intensity of light reflected from a target in a predetermined range of a radiated light beam is substantially constant.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 4A is a diagram showing movement of a mobile body radiating a light transmission beam;

FIG. 4B is a diagram showing distance information measured by the distance measuring apparatus mounted on the mobile body shown in FIG. 4A, while the mobile body is moving;

FIG. 5A is a diagram showing a distance measuring apparatus according to a second embodiment of the present invention; and FIG. 5B is a diagram showing another conductive member having triaxial flexibility, which can be used in place of the conductive member shown in FIG. 5A.

DETAILED DESCRIPTION OF THE INVENTION

Embodiments of the present invention will now be described with reference to the accompanying drawings.

A first embodiment of the present invention will be described with reference to FIGS. 1A, 1B, 2A, 2B, 3A and 3B.

Figure 3A:
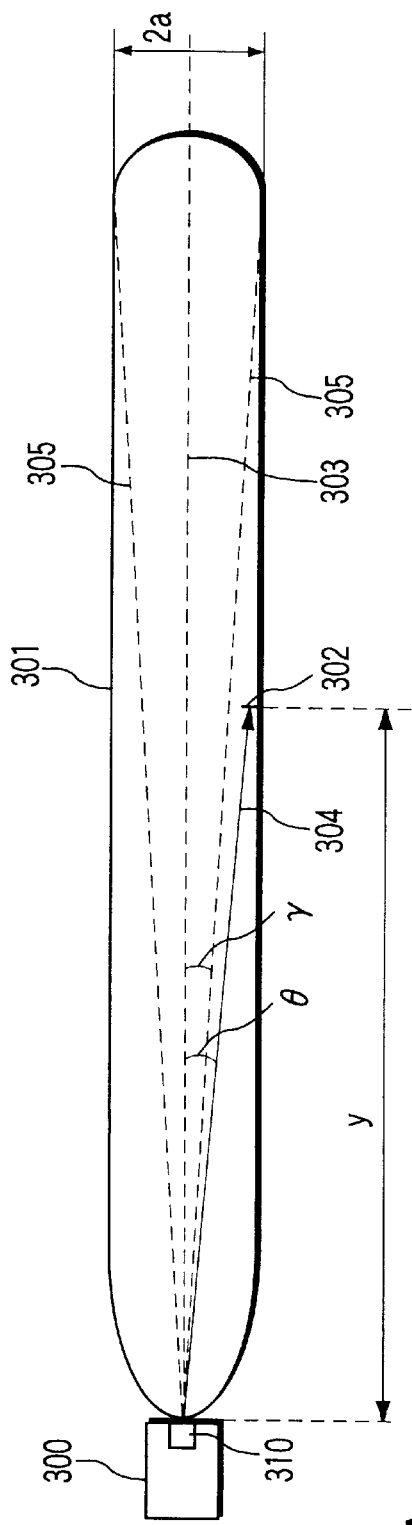
FIG. 3A is a diagram showing the shape of a transmission light beam radiated forward from a mobile body on which a distance measuring apparatus having the light transmitting lens shown in FIGS. 1A and 1B is mounted.
Figure 3B:
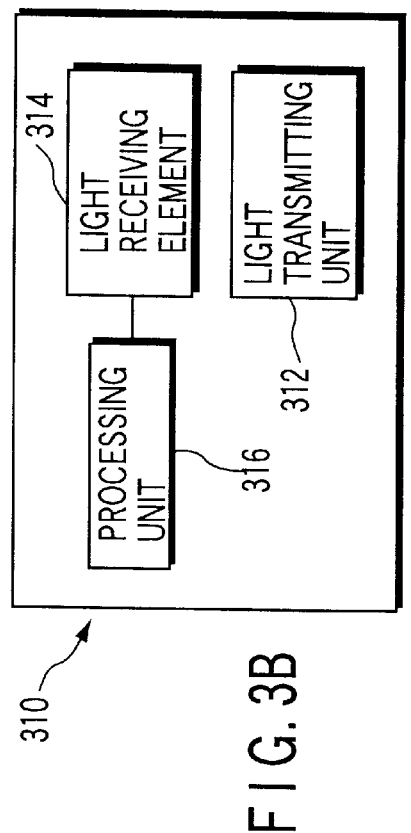
FIG. 3B is a schematic view showing the structure of a distance measuring apparatus shown in FIG. 3A.

In FIG. 3A, a reference numeral 300 denotes a mobile body, such as an automobile or autonomous robot, on which a distance measuring apparatus 310 according to the first embodiment is mounted. As shown in FIG. 3B, the distance measuring apparatus includes a light transmitting unit 312 for radiating a light beam for distance measurement, a light receiving element 314 for detecting light reflected by a target, e.g., an obstacle, and a processing unit 316 for processing a signal supplied from the light receiving unit 314.

Figure 1A:
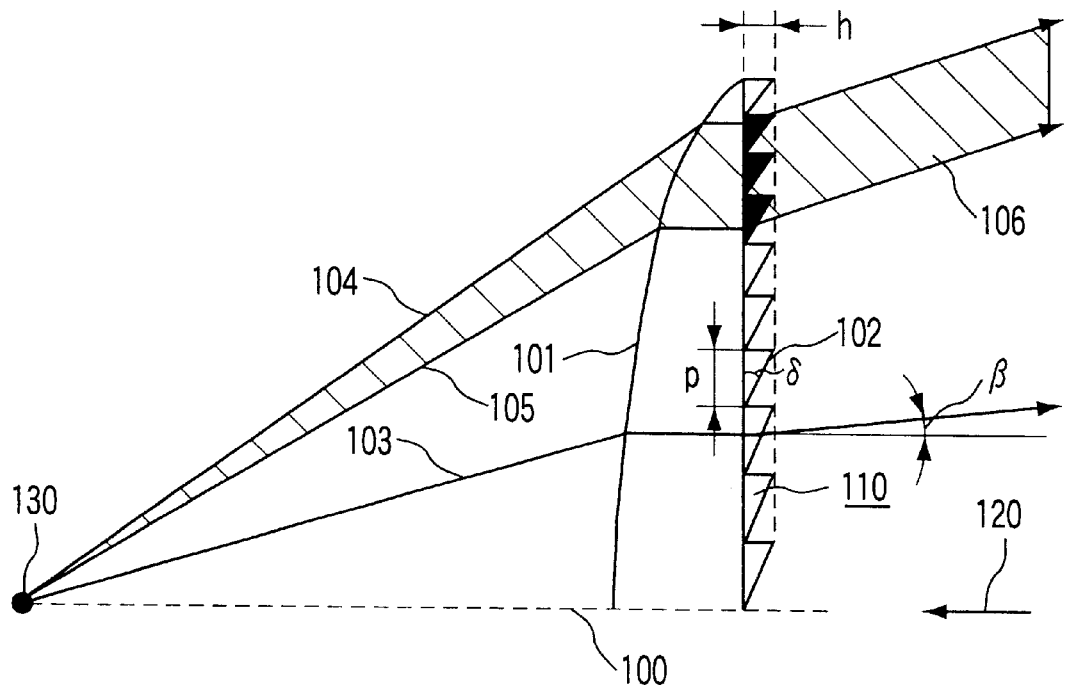
FIG. 1A is a cross-sectional view of a light transmitting lens including a diffusion element used in a distance measuring apparatus according to a first embodiment of the present invention.

The light receiving element 314 generates a signal corresponding to the amount of received light. The light receiving element comprises, for example, a PIN diode. The light transmitting unit 312 has a light source 130 for generating a light beam and a light transmitting lens 101 for partially diffusing and transmitting forward the light beam emitted from the light source 130, as shown in FIG. 1A. The light source 130 comprises, for example, a semiconductor laser diode. The light emitted from the light source may be continuous light or pulse light.

As shown in FIG. 1A, the light transmitting lens 101 has a diffusing element 110 in a part thereof.

The diffusing element 110 is constituted by a number of small prisms 102. The small prisms have the same height h and different pitches p depending on the distances from an optical axis 100. Accordingly, the apical angles $\delta$ of the prisms are different in accordance with the distances from the optical axis 100.

The light transmitting lens 101 has a function for collimating a light beam emitted from the light source 130 at a predetermined angle with respect to the optical axis. Since the small prisms 102 constituting the diffusing element 110 have different apical angles $\delta$ depending on their positions, lights 103 and 104 incident on different positions are deflected at different angles.

The deflection angle $\beta$ is represented by the equation $\beta=\arcsin (n \sin \delta)-\delta$. If the apical angle $\delta$ is small, the deflection angle $\beta$ approximates to $\beta=(n-1) \delta$. The symbol n denotes a refractive index of the small prism 102.

The hatched portion between the light 104 and 105 indicates one of divergent light beams radiated in different directions from the light source 130. This light beam is collimated by the light transmitting lens 101 in substantially the same direction and thereafter transmitted through the small prisms 102 painted black in FIG 1A. If the black-painted small prisms 102 have the same pitch, the lights transmitted therethrough are converted to a light beam traveling in a predetermined direction as indicated by a light beam 106. In other words, the small prisms of the same pitch have a function for converting a thin beam radiated from the light source 130 to a thin beam traveling in a predetermined direction.

Figure 1B:
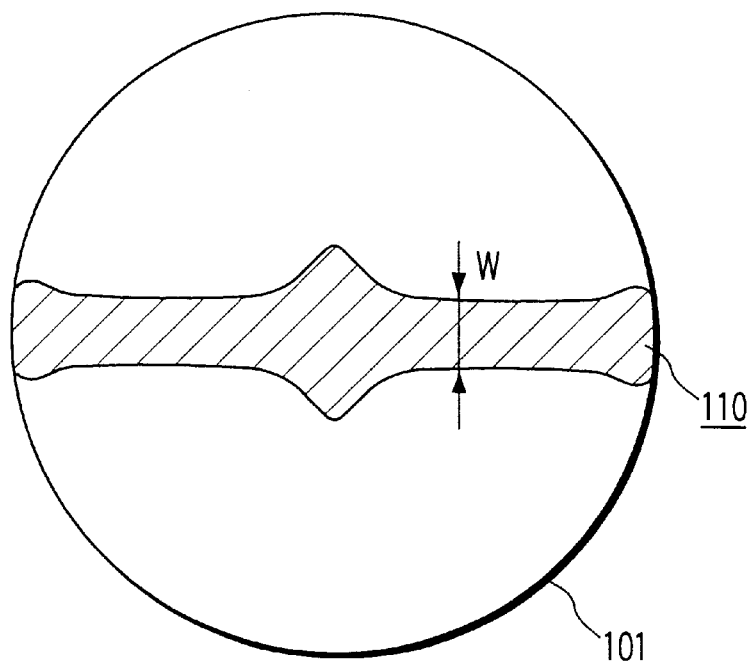
FIG. 1B is a front view of the light transmitting lens shown in FIG. 1A.

As shown in FIG. 1B, the diffusion element 110 is formed in a specified region indicated by a hatched portion on a plane viewed from the direction indicated by the arrow 120. The light beams passed through the region of the diffusion element 110 of the light transmitting lens 101 are deflected at predetermined angles depending on the positions; however, the light beams passed through the other region of the light transmitting lens 101 are collimated without deflection. In other words, the ratio of the deflected light beams to all the transmission light beams is regulated in accordance with the change in shape of the hatched portion shown in FIG. 1B, i.e., the width w.

Referring to FIG. 3A, the mobile body 300 having the distance measuring apparatus radiates a transmission light beam 301 forward through the light transmitting lens 101. The transmission light beam 301 extends substantially in parallel around an optical axis 303 in front of the mobile body 300 by the function of the diffusion element 110. The outline of the region having a width 2$a$ shown in FIG. 3A represents a detection region where an obstacle can be detected.

In FIG. 3A, a target 302 is positioned on the boundary of the detection region, i.e., at a limit position outside of which the target cannot be detected. In other words, of all the light components scattered by the target 302, the amount of light received by the light receiving element of the distance measuring apparatus is the limit value, which does not change even if the target 302 moves along the boundary in parallel with the optical axis 303.

Thus, the transmission light beam 301 with a constant width extending forward from the mobile body 300 allows detection of an obstacle positioned outside the transmission light beam 305 transmitted through a light transmitting lens in which no diffusion element is formed. More specifically, the target 302 depicted in FIG. 3A is positioned outside the transmission light beam 305 making a divergence angle $\gamma$ formed by a normal light transmitting lens having no diffusion element. Therefore, it cannot be detected by the normal transmission light beam 305. However, since the transmission light beam 301 includes the light 304 making a divergence angle $\theta$ directed to the target 302, it allows to detect the target 302.

Thus, the transmission light beam 301 detects all obstacles presenting in front of the mobile body 300, whereas it scarcely detects an obstacle out of the traveling path. Thus, the transmission light beam 301 is useful for simplification of obstacle recognizing software.

Conditions of the transmission light beam for forming a suitable detection region will be described below. The vertical distance (along the optical axis) between the distance measuring apparatus and the target 302 is represented by y, and the angle formed between the optical axis and the light 304 directing to the target 302 is represented by $\theta$. Assuming that the strength of the light 304 at the target 302 is I(y, $\theta$), the amount of light $I_a$ received by the light receiving element is represented by the following equation:

$$I_a = I(Y, \theta) S_a T_a \rho / (2\pi (y \sec \theta)^2) = \text{const.} \tag{1}$$

where $S_a$ represents the area of a light receiving portion, $T_a$ represents the transmission coefficient of the light receiving portion, and $\rho$ represents the reflectance of the target.

If the "cosine quartic-law" is established, the transmission coefficient of the light receiving portion is represented by $T_a = \epsilon \cos^4 \theta$, where $\epsilon$ expresses the aperture efficiency, that is, the ratio of the effective aperture of the light receiving lens viewed in the optical axis direction to the effective aperture of the light receiving lens viewed at the angle $\theta$ with the optical axis.

The intensity distribution I(y, $\theta$) of light collimated by a light transmitting lens having no diffusion element is represented by the following equation, assuming that the divergence angle is $\gamma$ and the amount of light transmitted through the light transmitting lens is $I_E$:

$$I(y, \theta) = I_E \exp(-\theta^2/\gamma^2)/(y \gamma)^2 \tag{2}$$

The intensity distribution of light influenced by the diffusion element 110 can be varied by changing the design of the diffusion element 110, i.e., the pitch or arrangement of the small prisms. However, in view of the above equation (2), it is assumed that the intensity distribution of I(y, $\theta$) is simply represented by the following equation, where $\alpha$ represents an equivalent divergence angle:

$$I(y, \theta) = I_E \sigma \cos \theta \exp(-\theta^2/\alpha^2) \tag{3}$$

In this equation, $\alpha$ represents an amplitude coefficient which means what amount of light is diffused. The amplitude coefficient depends on the distance in the radical distance r of the light transmitting lens and the width w of the diffusion element, and is, therefore, expressed by $\sigma = \sigma(r, w)$. Cos $\theta$ in the above equation (3) means a compensation based on the fact that the normal line of the target 302 and the light 304 forms the angle $\theta$.

The above term "equivalent" means the following matters. The light influenced by the diffusion element 110 is a set of light beams traveling in directions at intervals as the light beam 106 shown in FIG. 1A. The shape of the envelope can be changed in accordance with the design of the diffusion element 110 into the Gaussian distribution.

When the equation (3) is substituted in the equation (1), the following equation is obtained.

$$I_a = I_E \sigma \cos \theta \exp(-\theta^2/\alpha^2) S_a T_a \rho / (2\pi (y \sec \theta)^2) = \text{const.} \tag{4}$$

Assuming that the "cosine quartic-law" is established, since $T_a$ is expressed by $T_a = \epsilon \cos^4 \theta$, the above equation (4) is expressed as follows:

$$I_a = I_E \sigma (\cos \theta)^5 S_a \epsilon \eta \exp(-\theta^2/\alpha^2)/(2\pi (y \sec \theta)^2) = \text{const.} \tag{5}$$

where $y = a/\tan \theta$. Assuming that $\epsilon = \cos \theta$, the following equation is obtained.

$$I_a = (S_a \rho \sigma I_E/(2\pi a^2)) \exp(-\theta^2/\alpha^2)(\cos \theta)^6 (\sin \theta)^2 = \text{const.} \tag{6}$$

Alternatively, the following equation is obtained, incorporating a factor independent of the angle $\theta$ into const.

$$\sigma I_E = \text{const.} \exp(\theta^2/\alpha^2)/((\cos \theta)^6 (\sin \theta)^2) \tag{7}$$

Consequently, it is only necessary that the amplitude coefficient $\sigma$ satisfy the following equation.

$$\sigma = \text{const.} \exp(\theta^2/\alpha^2)/((\cos \theta)^6 (\sin \theta)^2) \tag{8}$$

Figure 2A:
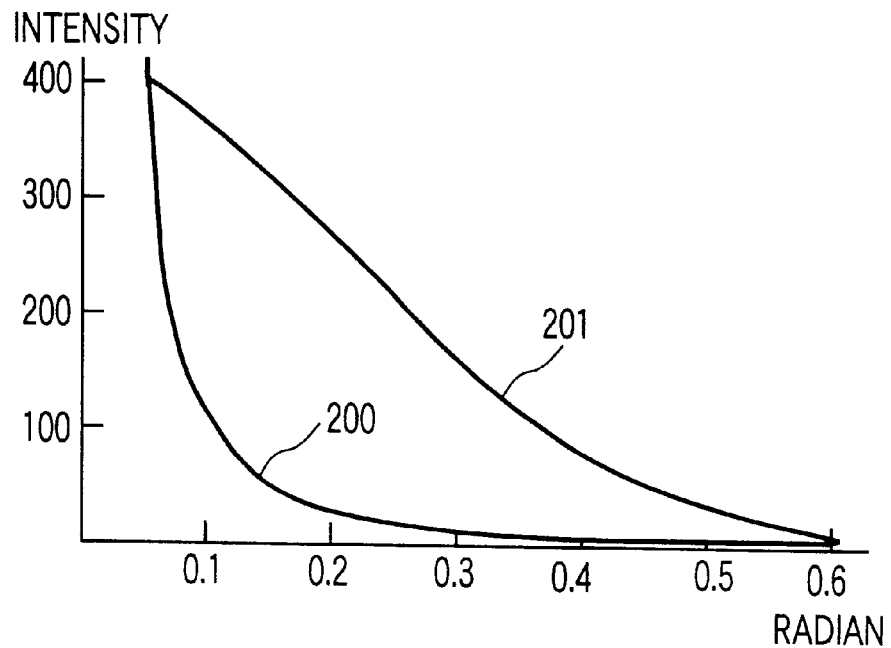
FIG. 2A is a graph showing $1/(\cos^6 \theta \sin^2 \theta)$ and $I_{E0}\exp(-\theta^2/\alpha^2)$.
Figure 2B:
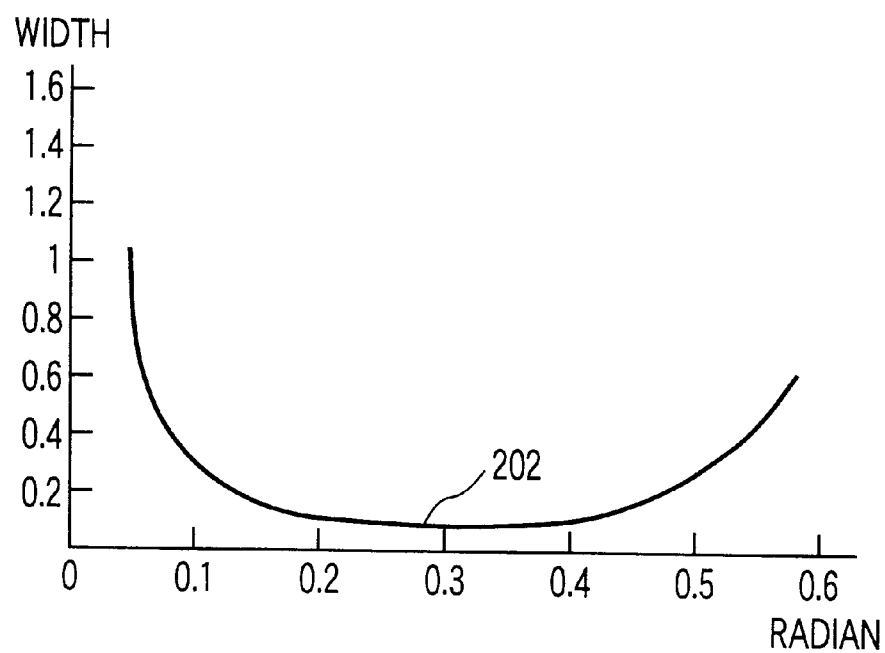
FIG. 2B is a graph showing the amplitude coefficient.

In FIG. 2A, the curve 200 denotes $1/((\cos \theta)^6 (\sin \theta)^2)$ and the curve 201 denotes $I_{E0} \exp(-\theta^2/\alpha^2)$. The scale of the ordinate may be of any unit. In FIG. 2B, the curve 202 denotes the amplitude coefficient $\sigma$. The width w shown in FIG. 1B schematically expresses the amplitude coefficient $\sigma$. Actually, in the assumed exponential intensity distribution as expressed by the equation (3), $\sigma = kr$ (k is a proportion constant) is tacitly assumed. However, this is a matter of design, and in general, $\theta$ is expressed by the equation $\theta = f(r)$ (f represents a function). The degree of freedom of the realizable shape of the transmission beam can be extended by changing not only the width w shown in FIG. 1B but also the function of $\theta = f(r)$.

As clear from the above explanation, the light beam 301 shown in FIG. 3A can be realized by determining the amplitude coefficient a as provided by, for example, the equation (8). Although FIG. 1B shows an example in which the region of the diffusion element is distributed along a diameter of the light transmitting lens 101, the distribution can be modified variously. For example, regions of the diffusion element can be dispersed on the surface of the light transmitting lens 101.

To make the explanation simple, the light transmitting lens 101 shown in FIG. 1A is a planoconvex lens and the diffusion element is formed on the plane surface. However, the light transmitting lens 101 may be constituted by an aspherical lens, and the diffusion element may be formed on a curved surface facing the light source. Further, a diffusion element need not be formed on the lens, but may be formed on a transparent plate arranged near the light transmitting lens.

Although the diffusion element is formed of small prisms in this embodiment, but can be realized by diffraction gratings, if the problem of efficiency is solved. Furthermore, although the above argument is limited to the distribution of the transmission light beam on a horizontal plane; however, the same can be applied to the distribution on a vertical plane perpendicular to the horizontal plane.

A second embodiment of the present invention will be described with reference to FIGS. 4A, 4B, 5A and 5B.

When a mobile body 400, such as an automobile, radiating a transmission light beam 401 moves along a route 402, the transmission light beam 401 moves along sides AB and BC of an obstacle 405, for example, a building, a wall or another mobile body. The distance information measured by the distance measurement apparatus mounted on the automobile 400 changes as indicated by the curve ABC shown in FIG. 4B.

The change is much greater than the actual change in distance between the automobile 400 and the obstacle 405. The longer the transmission light beam 401 in the traveling direction and the longer the sides AB and BC, the greater the difference between the change in distance information and the actual change. The problem in connection with the distance information of the side BC is less, since the direction of the side coincides with the direction in which the automobile is removed. However, since the distance information of the side AB is not distinct from that in a case where the obstacle 405 approaches at high speed, an erroneous warning may be generated. The second embodiment provides means for avoiding such an erroneous warning.

As shown in FIG. 5A, the distance measuring apparatus of this embodiment comprises a light transmitting lens 501, a light source 502, a driver circuit 503 for driving the light source, a conductive member 504 connecting the light source 502 and the driver circuit 503, a driver unit 505 for oscillating the light source 502 perpendicular to the optical axis, and a light receiving element 509 for receiving light reflected by a target.

The light transmitting lens 501 is the same as that of the first embodiment described with reference to FIG. 1A. The conductive member 504 is a thin plate having flexibility in the direction of the thickness thereof, i.e., leftward and rightward in FIG. 5A. As a result, the light source 502 is supported by the conductive member 504 fixed to the driver circuit 503 so as to be movable in directions perpendicular to the optical axis 500 as indicated by the arrows. Alternatively, as shown in FIG. 5B, the conductive member 504 may be twisted or given flexibility in the longitudinal direction, so that it has triaxial flexibility.

The driver circuit 503 includes an amplitude calculating section 506 for calculating the amplitude of a reflected light beam in response to a signal from the light receiving element, a rotation detecting section 507 for detecting rotation of the light source 502, and a target discriminating section 508 for discriminating a target based on outputs from the amplitude calculating section and the rotation detecting section.

When the automobile 400 moves along the route 402 as shown in FIG. 4A, if it is detected that the automobile 400 begins to turn based on a turn signal from a steering wheel or a signal from an acceleration sensor incorporated in the distance measuring apparatus, the driver unit 505 vibrates the light source 502 in the direction perpendicular to the optical axis 500 at a very small amplitude by an angle of about 1°. As a result, the transmission light beam 401 is vibrated at a very small amplitude to the left and right with respect to the traveling direction.

When the automobile 400 moves as shown in FIG. 4A, the distance measuring apparatus obtains a signal vibrating between, for example, the points P and Q. Since the signal have a comparatively large amplitude, it is possible to distinguish between a reflection signal in a case where an obstacle is approaching at high speed and a reflection signal by a large obstacle. More specifically, when turn of the vehicle is detected on the basis of a turn signal of the steering wheel or a signal from the acceleration sensor, and if the amplitude of the reflection signal when the light beam is vibrated as described above exceeds a predetermined value, it is determined that the light beam for measuring a distance moves across an obstacle. Thus, a comparatively large obstacle can be discriminated. In the case of a small obstacle, even if the transmission light beam 401 is vibrated at a very small amplitude, the distance between the automobile 401 and an actual obstacle is changed little, and the reflection signal has a small amplitude. Therefore, when the automobile turns to the left or right at a crossing, it is possible to discriminate whether the signal represents an actual change of the distance or the signal is a pseudo signal.

The longer the transmission light beam 401 in the traveling direction and the longer the side AB, the greater the magnitude of a pseudo signal. Accordingly, it is advantageous that the length of the transmission light beam 401 in the traveling direction is short, when the automobile 400 starts to turn. Therefore, the distance measuring apparatus preferably has a mechanism for reducing the length of the transmission light beam 401 in the traveling direction when it is detected that the automobile 400 starts to turn. The mechanism is particularly effective when the automobile turns to the left or right at a crossing, changes a lane, or threads its way through other automobiles.

With the structure shown in FIG. 5A, the transmission light beam can be shortened by reducing the distance between the light transmitting lens 501 and the light source 502. As the distance between the light transmitting lens 501 and the light source 502 is shortened, the light beam radiated from the light source 502 extends over the effective aperture of the light transmitting lens 501. Accordingly, the amount of light passing through the light transmitting lens 501 is reduced. As a result, the distance covered by the transmission light beam 401 is reduced, resulting in a short beam.

A short beam can also be realized by other methods. For example, the distance measuring apparatus may have a long transmission beam and a short transmission beam, so that the long beam, which is used in normal traveling, can be switched to the short beam when a turn is detected. Alternatively, the distance measuring apparatus may be designed such that the light source is driven by a variable voltage or current, and when a turn is detected, the output of the light source is reduced, thereby practically shortening the beam.

A pseudo signal can be output also when the automobile is traveling on a bad road having a considerably irregular surface. In the case of traveling on a flat road, the transmission light beam 401 extends substantially parallel to the road. On the other hand, when traveling on a bad road, the angle formed between the automobile 400 and the road surface is greatly changed, and a pseudo signal as shown in FIG. 4B is generated. With the structure shown in FIG. 5A, generation of a pseudo signal can be suppressed, by detecting an angle formed between the automobile 400 and the road surface with a triaxial acceleration sensor or the combination of a triaxial acceleration sensor and a sensor for detecting horizontal, and driving the light source 502 in a direction perpendicular to the plane of the drawing so as to compensate for the angle.

Although there is a possibility of crosstalk between mobile bodies, each having an apparatus of the present invention, crosstalk can be prevented by applying the conventional crosstalk preventing technique. For example, by generating light pulses at random frequencies from the light source and receiving with the light receiving unit in synchronism with the generation, crosstalk between the two mobile bodies can be prevented.

The present invention is not limited to the above embodiments but includes all embodiments within the spirit and scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A distance measuring apparatus for measuring a distance to a target by measuring a period of time in which a light beam goes to the target and returns, said distance measuring apparatus comprising:

a light source for emitting a light beam;

deflecting means for deflecting the light beam emitted from the light source; and light receiving means for receiving the light beam reflected by the target, wherein the deflecting means has a shape projected on a plane perpendicular to an optical axis such that an intensity of the light beam received by the light receiving means is constant, and wherein the light beam emitted from the light source has an intensity distribution of Gaussian distribution, and the shape of the deflecting means is encircled by a curved line expressed by $\exp(\theta^2/\alpha^2)/(\cos^6\theta \sin^2\theta)$, where $\theta$ represents an angle formed between the optical axis and light beams to be deflected and $\alpha$ represents a divergence angle of the light beam emitted from the light source.

2. A distance measuring apparatus for measuring a distance to a target by measuring a period of time in which a light beam goes to the target and returns, said distance measuring apparatus comprising:

a light source for emitting a light beam;

deflecting means for deflecting the light beam emitted from the light source;

light receiving means for receiving the light beam reflected by the target;

wherein the deflecting means has a shape projected on a plane perpendicular to an optical axis such that an intensity of the light beam received by the light receiving means is constant;

light source vibrating means for vibrating the light source in a direction perpendicular to the optical axis;

amplitude calculating means for calculating an amplitude of the reflected light beam on the basis of a signal output from the light receiving means;

rotation detecting means for detecting rotation of the light source; and target discriminating means for discriminating the target based on outputs from the amplitude calculating means and the rotation detecting means.

3. A distance measuring apparatus for measuring a distance to a target by measuring a period of time in which a light beam goes to the target and returns, said distance measuring apparatus comprising:

a light source for emitting a light beam;

a light transmitting lens for transmitting the light beam emitted from the light source; and a light receiving element for receiving the light beam reflected by the target, wherein the light transmitting lens includes in a portion thereof a diffusion element for deflecting the light beam, and the diffusion element has a shape in which an intensity of the light beam received by the light receiving element is constant in a region having a constant width and extending in parallel with the optical axis forward from the distance measuring apparatus.

4. The distance measuring apparatus according to claim 3, wherein the diffusion element includes a number of small prisms provided in a portion of the light transmitting lens, said number of small prisms having different apical angles in accordance with distances from the optical axis.

5. The distance measuring apparatus according to claim 4, wherein said number of small prisms have the same height and different pitches in accordance with the distances from the optical axis.

6. The distance measuring apparatus according to claim 3, wherein the light source emits a light beam having an intensity distribution of Gaussian distribution, and the diffusion element has a shape encircled by a curved line expressed by $\exp(\theta^2/\alpha^2)/(\cos^6\theta \sin^2\theta)$, where $\theta$ represents an angle formed between the optical axis and light beams to be deflected and $\alpha$ represents a divergence angle of the light beam emitted from the light source.

* * * * *

UNITED STATES PATENT AND TRADEMARK OFFICE
CERTIFICATE OF CORRECTION

PATENT NO. : 6,141,085
DATED : October 31, 2000
INVENTOR(S) : Kato et al.

Page 1 of 1

It is certified that error appears in the above-identified patent and that said Letters Patent is hereby corrected as shown below:

<u>Title page,</u>
Item [56] References Cited, under "U.S. PATENT DOCUMENTS",
insert -- 5,148,317   9/1992   Foresi
         5,283,622   2/1994   Ueno et al.
         5,291,270   3/1994   Koch et al.
         5,691,725   11/1997  Tanaka --, Under "FOREIGN PATENT DOCUMENTS",
insert -- 717 288 A1   6/1996 Europe --.

Signed and Sealed this

Sixth Day of November, 2001

*Attest:*

NICHOLAS P. GODICI
*Attesting Officer*    *Acting Director of the United States Patent and Trademark Office*